(12) United States Patent
Fukumoto et al.

(10) Patent No.: US 8,909,273 B2
(45) Date of Patent: Dec. 9, 2014

(54) WIRELESS COMMUNICATION SYSTEM, WIRELESS COMMUNICATION METHOD, TERMINAL APPARATUS, AND COMMUNICATION APPARATUS

(75) Inventors: Shusaku Fukumoto, Osaka (JP); Katsutoshi Ishikura, Osaka (JP); Shinichi Sawada, Osaka (JP); Hirokazu Kobayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 406 days.

(21) Appl. No.: 13/322,534

(22) PCT Filed: May 19, 2010

(86) PCT No.: PCT/JP2010/003360
§ 371 (c)(1),
(2), (4) Date: Nov. 25, 2011

(87) PCT Pub. No.: WO2010/137259
PCT Pub. Date: Dec. 2, 2010

(65) Prior Publication Data
US 2012/0094706 A1 Apr. 19, 2012

(30) Foreign Application Priority Data
May 25, 2009 (JP) ................................ P2009-125408

(51) Int. Cl.
*H04B 7/00* (2006.01)
*H04W 72/04* (2009.01)

(52) U.S. Cl.
CPC ........ *H04W 72/048* (2013.01); *H04W 72/0413* (2013.01); *H04W 72/0453* (2013.01)
USPC ...... 455/509; 455/452.1; 455/512; 455/67.11

(58) Field of Classification Search
CPC .......................... H04W 72/0453; H04W 72/06
USPC ............. 455/509, 452.1, 452.2, 450, 62, 512, 455/514, 67.11, 103, 434, 515, 150.1, 454; 370/329, 330, 332, 324
See application file for complete search history.

(56) References Cited

U.S. PATENT DOCUMENTS 8,213,867 B2 * 7/2012 Zhang et al. .................. 455/62
2005/0064831 A1 * 3/2005 Feenstra et al. ............ 455/150.1

(Continued)

FOREIGN PATENT DOCUMENTS

WO WO 2006/125738 A1 11/2006
WO WO 2009/009402 A1 1/2009

OTHER PUBLICATIONS

3GPP TR 36.814 V0.4.1, "3rd Generation Partnership Project; Technical Specification Group Radio Access Network; Further Advancements for E-UTRA Physical Layer Aspects" Release 9, Feb. 2009.

(Continued)

*Primary Examiner* — John J Lee
(74) *Attorney, Agent, or Firm* — Birch, Stewart, Kolasch & Birch, LLP (57) ABSTRACT

A wireless communication system includes at least one terminal apparatus and one communication apparatus which perform communication in a plurality of frequency bands. The terminal apparatus includes: a function information storing unit which pre-stores frequency band information indicating available frequency bands among the plurality of frequency bands and the number of simultaneously available frequency bands; and a terminal control unit which reads the frequency band information stored in the function information storing unit and transmits the read frequency band information to the communication apparatus via a first wireless communication unit. The communication apparatus includes: a base station control unit which selects at least one frequency band from the plurality of frequency bands based on the frequency band information transmitted from the terminal apparatus; and a second wireless communication unit which communicates with the terminal apparatus by use of the frequency band selected by the base station control unit.

6 Claims, 7 Drawing Sheets

(56) References Cited

U.S. PATENT DOCUMENTS

2005/0085214 A1    4/2005  Laroia et al.
2006/0199544 A1    9/2006  Ramakrishna et al.

OTHER PUBLICATIONS

3GPP TSG RAN WG1 Meeting #54, R1-083225, "LTE-A Spectrum Aggregation Scenarios and Impact of UE Architecture" Motorola, Agenda item 12, Aug. 18-22, 2008.

3GPP TSG RAN WG1 Meeting #54bis, R1-083828, "Text Proposal for LTE-A Spectrum Aggregation Scenarios and Their Impact on UE Architecture", Motorola, Agenda item 11, Sep. 29-Oct. 3, 2008.

3GPP TSG RAN WG1 Meeting #55, R1-084405, "Spectrum Aggregation Operations—UE Impact Considerations" Agenda Item 11-,1, Nov. 10-14, 2008.

International Search Report, dated Jun. 22, 2010, Issued in PCT/JP2010/003360.

Written Opinion of the International Search Authority, dated Jun. 22, 2010, issued in PCT/JP2010/03360.

\* cited by examiner

| IDENTIFIER OF TERMINAL APPARATUS 10 DURING CONNECTION | FREQUENCY BAND ALLOCATED TO TERMINAL APPARATUS 10 | | | | |
|---|---|---|---|---|---|
| T0001 | Band1 | Band3 | | | |
| T0002 | Band2 | | | | |
| ⋮ | ⋮ | ⋮ | ⋮ | ⋮ | ⋮ |
| T0044 | Band2 | Band4 | | | |

| EXCLUSIVELY AVAILABLE COMBINATION | Band5 | Band4 | Band3 | Band2 | Band1 |
|---|---|---|---|---|---|
| PATTERN 1 | 0 | 0 | 0 | 1 | 1 |
| PATTERN 2 | 0 | 0 | 1 | 0 | 0 |
| PATTERN 3 | 0 | 0 | 0 | 0 | 0 |
| PATTERN 4 | 0 | 0 | 0 | 0 | 0 |
| PATTERN 5 | 0 | 0 | 0 | 0 | 0 |

| | COMBINATION OF FREQUENCY BANDS ||||||||||
| --- | --- | --- | --- | --- | --- | --- | --- | --- | --- | --- |
| | HIGH ←  PRIORITY  → LOW |||||||||| 
| USE OF ONE FREQUENCY BAND | 00001 | 00010 | 00100 | 01000 | 00000 | | | | | |
| SIMULTANEOUS USE OF TWO FREQUENCY BANDS | 00101 | 00110 | 01001 | 01010 | 00000 | 00000 | 00000 | 00000 | 00000 | 00000 |
| SIMULTANEOUS USE OF THREE FREQUENCY BANDS | 00000 | 00000 | 00000 | 00000 | 00000 | 00000 | 00000 | 00000 | 00000 | 00000 |
| SIMULTANEOUS USE OF FOUR FREQUENCY BANDS | 00000 | 00000 | 00000 | 00000 | 00000 | | | | | |
| SIMULTANEOUS USE OF FIVE FREQUENCY BANDS | 00000 | | | | | | | | | |

FIG. 11

WIRELESS COMMUNICATION SYSTEM, WIRELESS COMMUNICATION METHOD, TERMINAL APPARATUS, AND COMMUNICATION APPARATUS

TECHNICAL FIELD

The present invention relates to a wireless communication system, a wireless communication method, a terminal apparatus, and a communication apparatus.

This application is based upon and claims the benefit of priority from Japanese Patent Application No. 2009-125408, filed May 25, 2009, the entire contents of which are incorporated herein.

BACKGROUND ART

In the standardization of Long Term Evolution (LTE)-Advanced (LTE-A) (also referred to as International Mobile Telecommunications-Advanced (IMT-A)), which is a $4^{th}$ generation wireless communication system, technology for implementing high-speed and large-capacity communication using a frequency band continuous in frequency or simultaneously using a plurality of frequency bands (20 MHz to 100 MHz) discontinuous in frequency has been studied (Non-Patent Document 1).

In order to maintain compatibility with $3.9^{th}$ generation (LTE) wireless communication systems, a base station apparatus based on LTE-A, which divides a plurality of frequency bands to be used by LTE-A into component carriers (for example, 20 MHz or the like) for each frequency band of a previous-generation wireless communication system, communicates with a previous-generation terminal apparatus using one of the component carriers, and communicates with a terminal apparatus of LTE-A by simultaneously using a plurality of component carriers over a plurality of frequency bands, has been studied.

For example, when each frequency band is divided into component carriers every 20 MHz in the base station apparatus of LTE-A having five frequency bands Band 1 to Band 5, the base station apparatus of LTE-A communicates with the previous-generation terminal apparatus by use of any one of component carriers of Band 1 to Band 5, and communicates with the terminal apparatus of LTE-A by use of a plurality of component carriers of all frequency bands Band 1 to Band 5.

However, because size reduction and low power consumption of a radio frequency (RF) front end for use in a terminal apparatus for performing communication using a wide frequency band defined in a specification of LTE-A are difficult, the terminal apparatus, which widens a frequency band to be used for communication to improve a communication speed by limiting a frequency band to be used and simultaneously using a few component carriers from a plurality of limited frequency bands, has been studied (Non-Patent Documents 2 and 3).

PRIOR ART DOCUMENT

Non-Patent Document

Non-Patent Document 1: 3GPP TR36.814 V0.4.1 (2009-02), 3rd Generation Partnership Project; Technical Specification Group Radio Access Network; Further Advancements for E-UTRA Physical Layer Aspects (Release 9)

Non-Patent Document 2: 3GPP Contribution, R1-084405, "Spectrum Aggregation Operations-UE Impact Considerations"

Non-Patent Document 3: 3GPP Contribution, R1-083225, "LTE-A Spectrum Aggregation Scenarios and Impact of UE"

DISCLOSURE OF INVENTION

Problem to be Solved by the Invention

However, what type of information is transmitted from a terminal apparatus to a base station apparatus so that the terminal apparatus communicates with the base station apparatus by use of a plurality of frequency bands when the plurality of frequency bands are used as described above has not been studied. Although a previous-generation terminal apparatus notifies the base station apparatus of information indicating a frequency band in which communication with the base station apparatus is possible, there is a problem in that frequency bands are not efficiently allocated by only the information and unnecessary allocation of frequency bands (radio resources) occurs. For example, the base station apparatus can perform communication using a system frequency band including five frequency bands Band 1 to Band 5, and the terminal apparatus is communicable using the frequency bands Band 1 to Band 5. However, when it is only possible to simultaneously use two frequency bands due to a limit of hardware resources, unnecessary allocation of radio resources occurs because component carriers of three frequency bands are not used if the base station apparatus allocates component carriers from all the five frequency bands Band 1 to Band 5. In the terminal apparatus, there is a possibility that unnecessary allocation of radio resources occurs even when a combination of frequency bands to be used is limited.

The present invention has been made to solve the above-described problems, and an object of the invention is to provide a wireless communication system in which a system frequency band includes a plurality of frequency bands and a base station apparatus efficiently allocates frequency bands to a terminal apparatus in which the use of frequency bands is limited.

Means for Solving the Problem (1) To solve the above-described problems, in a first aspect of the present invention, there is provided a wireless communication system including at least one terminal apparatus and one communication apparatus which perform communication in a plurality of frequency bands, wherein the terminal apparatus includes: a function information storing unit which pre-stores frequency band information indicating available frequency bands among the plurality of frequency bands and the number of simultaneously available frequency bands; and a terminal control unit which reads the frequency band information stored in the function information storing unit and transmits the read frequency band information to the communication apparatus via a first wireless communication unit, and wherein the communication apparatus includes: a base station control unit which selects at least one frequency band from the plurality of frequency bands based on the frequency band information transmitted from the terminal apparatus; and a second wireless communication unit which communicates with the terminal apparatus by use of the frequency band selected by the base station control unit.

(2) In the first aspect of the present invention, the frequency band information may include information indicating combinations of the frequency bands simultaneously available to the terminal apparatus among the plurality of frequency bands as the available frequency bands and the simultaneously available frequency bands.

(3) In the first aspect of the present invention, the frequency band information may include information associated with priority for selection for the plurality of frequency bands.

(4) In the first aspect of the present invention, the terminal apparatus may include an abnormality detecting unit which deletes a frequency band from the frequency band information stored in the function information storing unit and updates the frequency band information if communication is not performed using the selected frequency band due to a failure of the first wireless communication unit or another purpose of use or if it is detected that communication quality is degraded to an extent to which communication is not maintained in the frequency band used for communication with the communication apparatus, the first wireless communication unit may transmit the frequency band information updated by the abnormality detecting unit to the communication apparatus, the base station control unit may select at least one frequency band from the plurality of frequency bands based on the updated frequency band information, and the second wireless communication unit may transmit information indicating the frequency band selected by the base station control unit to the terminal apparatus and communicates with the terminal apparatus by use of the selected frequency band.

(5) In the first aspect of the present invention, the function information storing unit may store a plurality of different pieces of the frequency band information, and the terminal control unit may select one piece of frequency band information from the plurality of different pieces of the frequency band information stored in the function information storing unit according to remaining power of a battery provided in its own terminal apparatus, and transmits the selected piece of the frequency band information to the communication apparatus via the first wireless communication unit.

(6) In the first aspect of the present invention, the function information storing unit may store the frequency band information corresponding to both uplink and downlink, and the base station control unit may select at least one frequency band from the plurality of frequency bands for both the uplink and the downlink based on the frequency band information stored in the function information storing unit.

(7) In a second aspect of the present invention, there is provided a wireless communication method for use in a wireless communication system including at least one terminal apparatus and one communication apparatus which perform communication in a plurality of frequency bands, the method including: reading, by a terminal control unit of the terminal apparatus, frequency band information indicating available frequency bands among the plurality of frequency bands and the number of simultaneously available frequency bands pre-stored in a function information storing unit; transmitting, by the terminal control unit of the terminal apparatus, the read frequency band information to the communication apparatus via a first wireless communication unit; selecting, by a base station control unit of the communication apparatus, at least one frequency band from the plurality of frequency bands based on the frequency band information transmitted from the terminal apparatus, and transmitting, by a second wireless communication unit, information indicating the selected frequency band to the terminal apparatus; and communicating, by the base station control unit of the communication apparatus, with the terminal apparatus by use of the selected frequency band.

(8) In a third aspect of the present invention, there is provided a terminal apparatus for use in a wireless communication system including at least one terminal apparatus and one communication apparatus which perform communication in a plurality of frequency bands, the terminal apparatus including: a function information storing unit which pre-stores frequency band information indicating available frequency bands among the plurality of frequency bands and the number of simultaneously available frequency bands; and a terminal control unit which reads the frequency band information stored in the function information storing unit and transmits the read frequency band information to the communication apparatus via a wireless communication unit.

(9) In a fourth aspect of the present invention, there is provided a communication apparatus for use in a wireless communication system including at least one terminal apparatus and one communication apparatus which perform communication in a plurality of frequency bands, the communication apparatus including: a base station control unit which selects at least one frequency band from the plurality of frequency bands based on frequency band information indicating frequency bands available to the terminal apparatus and the number of simultaneously available frequency bands received from the terminal apparatus; and a wireless communication unit which transmits information indicating the frequency band selected by the base station control unit to the terminal apparatus and communicates with the terminal apparatus by use of the selected frequency band.

Effects of the Invention

According to the present invention, it is possible to efficiently allocate frequency bands to a terminal apparatus in which the use of frequency bands divided by a base station apparatus is limited when a system frequency band is divided into a plurality of frequency bands.

BEST MODE FOR CARRYING OUT THE INVENTION

Hereinafter, a wireless communication system, a base station apparatus (communication apparatus), a terminal apparatus, and a wireless communication method according to embodiments of the present invention will be described with reference to the drawings. Hereinafter, an example in which a system frequency band of the wireless communication system includes five frequency bands Band 1 to Band 5 will be described.

First Embodiment

Figure 1:
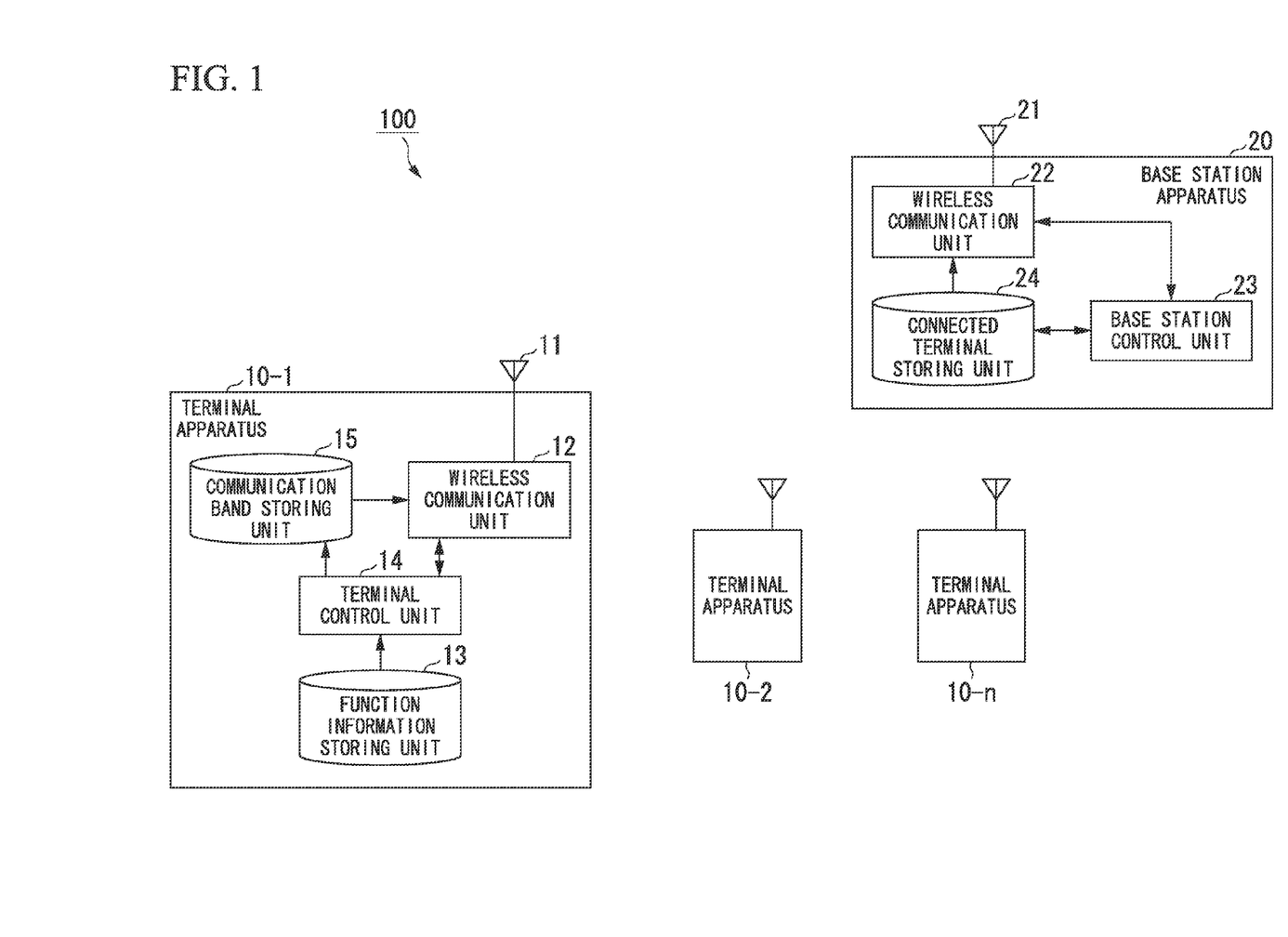
FIG. 1 is a schematic block diagram showing a configuration of a wireless communication system 100 according to a first embodiment.

FIG. 1 is a schematic block diagram showing a configuration of a wireless communication system 100 according to the first embodiment. As shown in FIG. 1, the wireless communication system 100 includes one or more terminal apparatuses 10-1, 10-2, ..., 10-n, and a base station apparatus 20. Here, the terminal apparatuses 10-1, 10-2, ..., 10-n have the same configuration. Hereinafter, any one or all of the terminal apparatuses 10-1, 10-2, ..., 10-n is/are representatively referred to as a terminal apparatus 10.

The terminal apparatus 10 includes an antenna 11, a wireless communication unit 12, a function information storing unit 13, a terminal control unit 14, and a communication band storing unit 15.

In the terminal apparatus 10, the wireless communication unit 12 communicates with the base station apparatus 20 via the antenna 11. Frequency band information indicating frequency bands available to its own terminal apparatus 10 is stored in the function information storing unit 13. When sending a connection request (attach request) to the base station apparatus 20, the terminal control unit 14 reads the frequency band information from the function information storing unit 13, and outputs connection request information including the read frequency band information and a terminal identifier for uniquely identifying its own terminal apparatus 10 to the wireless communication unit 12. The terminal control unit 14 reads information indicating a frequency band to be used for communication with the base station apparatus 20 from connection approval information as a response to the connection request received by the wireless communication unit 12 from the base station apparatus 20, and causes the communication band storing unit 15 to store the information indicating the read frequency band. The frequency band to be used when the wireless communication unit 12 communicates with the base station apparatus 20 is stored in the communication band storing unit 15.

Here, the connection request information includes the frequency band information as part of information (user equipment (UE) capability information) indicating communication capability of its own terminal apparatus 10, and includes the terminal identifier for identifying its own terminal apparatus 10, information for requesting a connection with the base station apparatus 20, and information indicating the purpose of the communication. For example, an example of the information indicating the purpose may be information indicating voice communication, file transmission, or data transmission in which delay control is necessary, and may include a required communication bandwidth and communication quality.

The base station apparatus 20 includes an antenna 21, a wireless communication unit 22, a base station control unit 23, and a connected terminal storing unit 24. In the base station apparatus 20, the wireless communication unit 22 communicates with the terminal apparatus 10 via the antenna 21. The base station control unit 23 receives an input of the connection request information received by the wireless communication unit 22 from the terminal apparatus 10, and reads the frequency band information and the terminal identifier included in the input connection request information.

The base station control unit 23 selects at least one frequency band from frequency bands shown in the read frequency band information, causes the connected terminal storing unit 24 to store the input terminal identifier of the terminal apparatus 10 and the selected frequency band, and generates the connection approval information as the response for the connection request information to output the generated information to the wireless communication unit 22. The connected terminal storing unit 24 stores the terminal identifier of the terminal apparatus 10 connected to its own apparatus and the frequency band being used for communication with the terminal apparatus 10. Here, the connection approval information includes the terminal identifier of the terminal apparatus 10 requesting the connection and the information indicating the selected frequency band. The frequency band selected by the base station control unit 23 is used for downlink for transmitting data from the base station apparatus 20 to the terminal apparatus 10 and uplink for transmitting data from the terminal apparatus 10 to the base station apparatus 20.

Here, the frequency band information stored in the function information storing unit 13 will be described.

For example, 3-bit width bitstreams of 001, 010, 011, 100, and 101 are sequentially allocated to the frequency bands Band 1 to Band 5, respectively. The number of frequency bands simultaneously available to the terminal apparatus 10, one through five, is expressed as 001 to 101 in 3 bits. A bitstream is generated by sequentially arranging 3-bit width bitstreams indicating frequency bands available to the terminal apparatus 10, and a bitstream in which 3 bits indicating the number of simultaneously available frequency bands are arranged in the end of the generated bitstream is used as the frequency band information.

Encoding of the frequency band information is predetermined, and the base station control unit 23 can acquire frequency bands available to the terminal apparatus 10 and the number of simultaneously available frequency bands by decoding frequency band information of a predetermined bit configuration.

Figure 2:
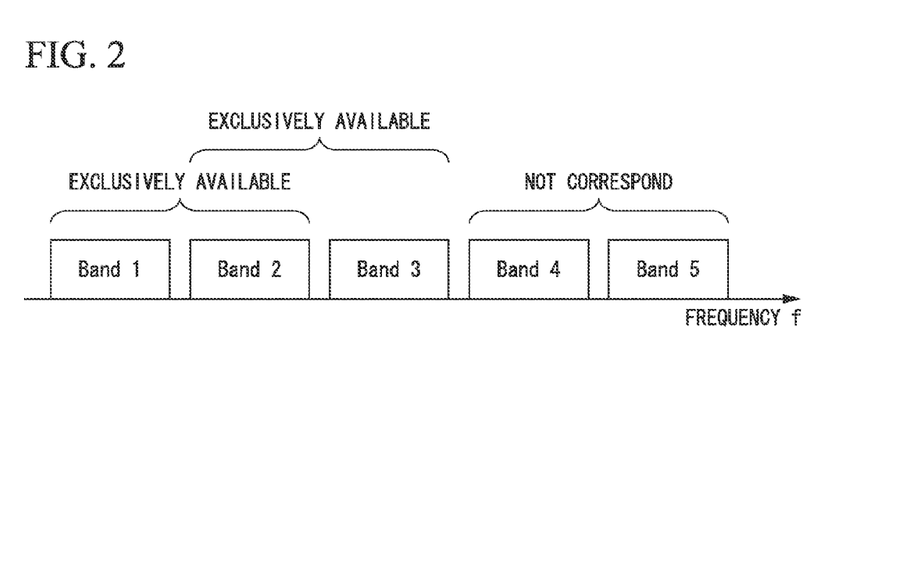
FIG. 2 is a diagram showing an example of frequency bands of a system frequency band available to a terminal apparatus 10 according to the same embodiment.

FIG. 2 is a diagram showing an example of frequency bands of the system frequency band available to the terminal apparatus 10 according to the same embodiment.

The terminal apparatus 10 has a use configuration of frequency bands as shown in FIG. 2 when the terminal apparatus 10 is limited by an RF circuit provided in the wireless communication unit 12, a baseband signal, and a hardware configuration such as the antenna 11, for example, as follows.

The wireless communication unit 12 of the terminal apparatus 10 has two RF circuits as the hardware configuration. One RF circuit can communicate with the base station apparatus 20 by any one of the frequency bands Band 1 and Band 2, and the other RF circuit can communicate with the base station apparatus 20 by any one of the frequency bands Band 2 and Band 3. The wireless communication unit 12 having the hardware configuration as described above can exclusively use Band 1 and Band 2 among the frequency bands Band 1 to Band 5 in the system frequency band, and can exclusively use Band 2 and Band 3, but does not correspond to and cannot use Band 4 and Band 5.

Figure 3:
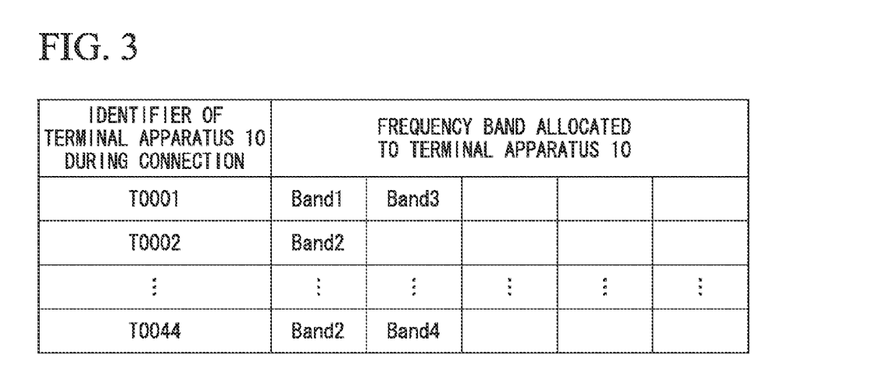
FIG. 3 is a diagram showing an example of information stored in a connected terminal storing unit 24 provided in a base station apparatus 20 according to the same embodiment.

FIG. 3 is a diagram showing an example of information stored in the connected terminal storing unit 24 provided in the base station apparatus 20 according to the same embodiment. In the connected terminal storing unit 24, the terminal identifier of the terminal apparatus 10 during the connection is stored in association with the information indicating the frequency band being used for communication allocated to the terminal apparatus 10. For example, the frequency bands ("Band 1" and "Band 3") are stored in association with a terminal identifier "T0001."

Figure 4:
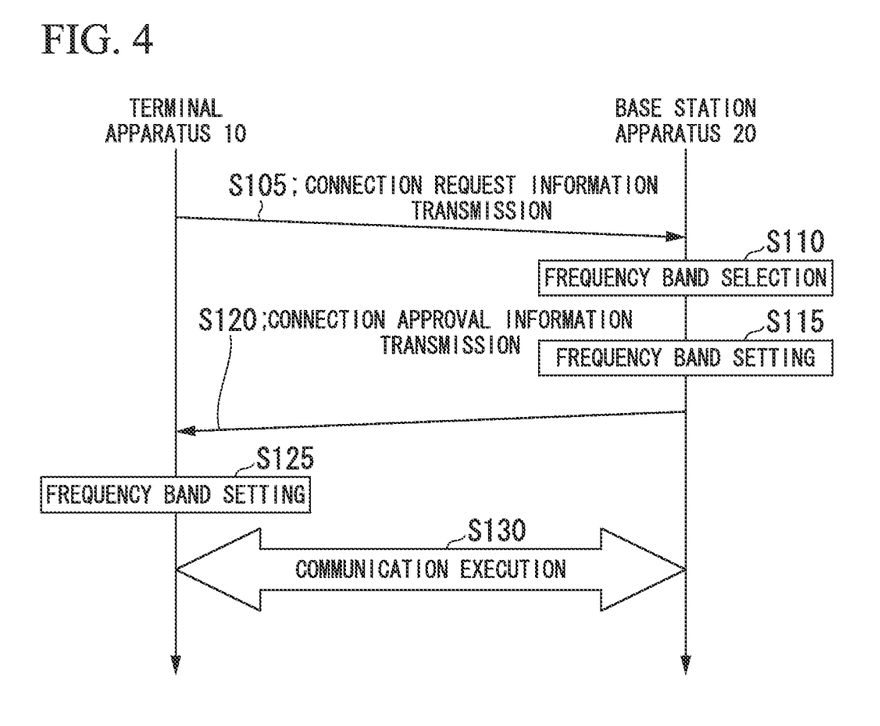
FIG. 4 is a diagram showing a sequence example of a connection process of setting frequency bands to be used for communication by the base station apparatus 20 and the terminal apparatus 10 in the wireless communication system 100 according to the same embodiment.

FIG. 4 is a diagram showing a sequence example of a connection process of setting frequency bands to be used for communication by the base station apparatus 20 and the terminal apparatus 10 in the wireless communication system 100 according to the same embodiment.

First, in the terminal apparatus 10, the terminal control unit 14 reads frequency band information from the function information storing unit 13, generates connection request information, which includes the read frequency band information and the terminal identifier of its own terminal apparatus 10 and requests a connection to the base station apparatus 20, and outputs the generated connection request information to the wireless communication unit 12. The wireless communication unit 12 transmits the connection request information output by the terminal control unit 14 to the base station apparatus 20 via the antenna 11 (step S105).

Here, the terminal apparatus 10 transmits the connection request information, for example, by use of a frequency band used when the base station apparatus 20 of a connection request destination is detected by a cell search.

In the base station apparatus 20, the wireless communication unit 22 receives the connection request information transmitted by the terminal apparatus 10, and outputs the received connection request information to the base station control unit 23. The base station control unit 23 reads the frequency band information included in the connection request information output by the wireless communication unit 22, sets the number of frequency bands simultaneously available to the terminal apparatus 10 indicated by the frequency band information to an upper limit, and selects a frequency band from the frequency bands available for communication by the terminal apparatus 10 indicated by the frequency band information (step S110).

Here, the base station control unit 23 reads use states of the frequency bands Band 1 to Band 5 included in the system frequency band from the connected terminal storing unit 24, and performs selection in sequence from a frequency band used for communication in which the number of other terminal apparatuses 10 is small among the frequency bands available for communication of the terminal apparatus 10. Also, the base station control unit 23 increases the number of frequency bands allocated according to purpose of communication included in the connection request information by setting the number of frequency bands simultaneously available to the terminal apparatus 10 to the upper limit. At this time, the base station control unit 23 performs selection in sequence from a frequency band used for communication in which the number of other terminal apparatuses 10 is small. Thereby, the use states of the frequency bands Band 1 to Band 5 are averaged.

The base station control unit 23 associates the terminal identifier of the terminal apparatus 10 included in the connection request information with the frequency band selected in step S110, and outputs and writes the result of association to the connected terminal storing unit 24 (step S115). Also, the base station control unit 23 generates connection approval information as a response to the received connection request including the information indicating the selected frequency band and the terminal identifier, and transmits the generated connection approval information to the terminal apparatus 10 requesting the connection via the wireless communication unit 22 (step S120).

In the terminal apparatus 10, the wireless communication unit 12 outputs the received connection approval information to the terminal control unit 14 when receiving the connection approval information from the base station apparatus 20. The terminal control unit 14 writes and stores the information indicating the frequency band included in the connection approval information output by the wireless communication unit 12 in the communication band storing unit 15 (step S125).

Thereafter, the wireless communication unit 12 of the terminal apparatus 10 communicates with the base station apparatus 20 by use of the frequency band stored in the communication band storing unit 15, and the wireless communication unit 22 of the base station apparatus 20 communicates with the terminal apparatus 10 by use of the frequency band corresponding to the terminal apparatus 10 stored in the connected terminal storing unit 24 (step S130).

In the wireless communication system 100 of this embodiment as described above, the terminal apparatus 10 transmits the connection request to the base station apparatus 20 by including information (UE capability information) indicating communication capability of its own terminal such as frequency bands available to its own terminal apparatus 10 and the number of simultaneously available frequency bands in connection request information indicating the connection request when the connection request to the base station apparatus 20 is generated, and the base station apparatus 20 selects frequency bands available for communication and the number thereof according to information included in the received connection request information, thereby preventing unnecessary allocation of radio resources such as allocation of frequency bands unavailable to the terminal apparatus 10 and efficiently allocating the frequency bands to the terminal apparatus 10.

Although the base station control unit 23 performs allocation in sequence from a frequency band in which the number of the terminal apparatuses 10 is small as a condition for selecting a frequency band, the frequency band may be selected in descending order of communication quality according to another factor, for example, a value of channel estimation performed in each frequency band in order to give the equal number of uses of a frequency. Although the terminal apparatus 10 transmits the connection request information by use of a frequency band used during the cell search, it may be transmitted using a predetermined frequency band.

Second Embodiment

Next, a configuration in which information indicating whether or not exclusive use is possible is included in a bitstream indicating frequency band information stored in the function information storing unit 13 of the terminal apparatus 10 will be described as the second embodiment. A wireless communication system according to the second embodiment is the same as that of the first embodiment, except that content of frequency band information to be stored in the function information storing unit 13 and transmitted by the terminal control unit 14 via the wireless communication unit 12 and the antenna 11 is different, and thus the content of the frequency band information will be described and other descriptions will be omitted.

When a system frequency band is divided into n frequency bands Band 1 to Band n as information indicating a combination of frequency bands simultaneously available to the terminal apparatus 10, frequency bands for bits are allocated in the order of Band 1 for the least significant bit, Band 2 for a more significant bit, and Band n for the most significant bit in n-bit data. For each combination of exclusively available frequency bands, "1" is allocated to a bit corresponding to a frequency band serving as an element of each combination and other bits are expressed as "0."

Figure 5:
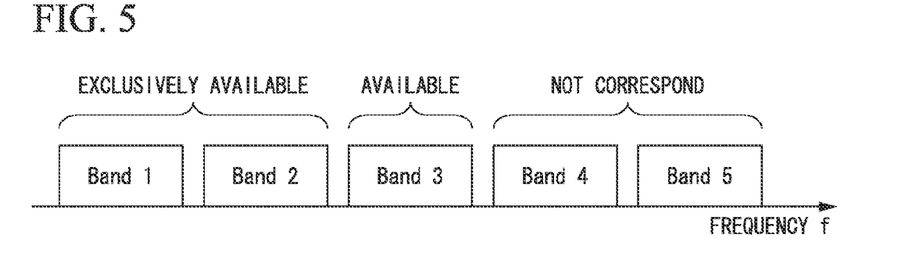
FIG. 5 is a diagram showing an example of frequency bands of a system frequency band available to a terminal apparatus 10 according to a second embodiment.

For example, the terminal apparatus 10 has a configuration using frequency bands as shown in FIG. 5 due to limitations by the hardware configuration and the like. FIG. 5 is a diagram showing an example of frequency bands of the system frequency band available to the terminal apparatus 10 according to the same embodiment. As shown, frequency bands Band 1 and Band 2 are exclusively available, a frequency band Band 3 is available without limitations, and frequency bands Band 4 and Band 5 do not correspond to the terminal apparatus 10, that is, are unavailable.

Figure 6:
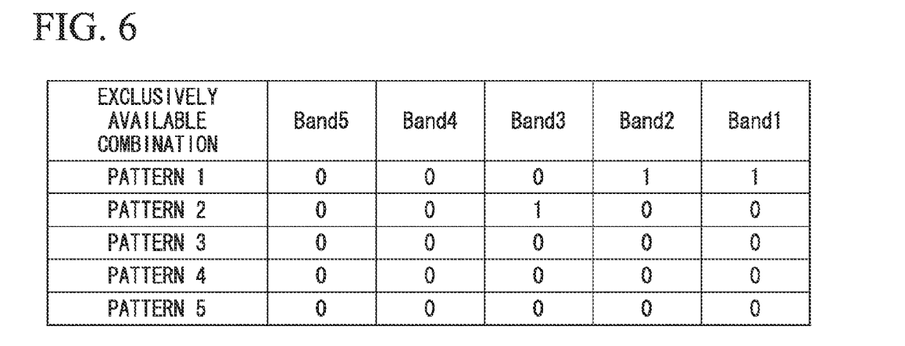
FIG. 6 is a diagram showing an example of frequency band information corresponding to a configuration using frequency bands shown in FIG. 5 according to the same embodiment.

FIG. 6 is a diagram showing an example of frequency band information corresponding to a configuration using the frequency bands shown in FIG. 5 according to the same embodiment. As shown, for the frequency band information, patterns indicating combinations of exclusively available frequency bands are stored, and the number of the patterns is five, which is equal to the number of frequency bands. For example, "00011" is stored in a pattern 1, which indicates that the frequency bands Band 1 and Band 2 are exclusively available, "00100" is stored as a pattern 2, which indicates that the frequency band Band 3 is available without limitations in the use of other frequency bands, and "00000" is stored as patterns 3 to 5, which, unlike the above, are not combinations of exclusively available frequency bands.

In the patterns 1 and 2 of the frequency band information, the terminal apparatus 10 can use three frequency bands, Band 1, Band 2, and Band 3, from positions (bits) in which "1" is arranged. From the two patterns of the frequency band information, it is indicated that the number of simultaneously available frequency bands is 2, and combinations of frequency bands available from the patterns 1 and 2 are only Band 1, only Band 2, only Band 3, a combination of Bands 1 and 2, and a combination of Band 2 and Band 3.

The terminal control unit 14 reads the patterns 1 to 5 stored in the function information storing unit 13, and transmits a bitstream "00011 00100 00000 00000 00000" obtained by sequentially arranging the read patterns 1 to 5 as the frequency band information to the base station apparatus 20 via the wireless communication unit 12. That is, the terminal apparatus 10 transmits frequency band information indicating available frequency bands of its own terminal apparatus, the number of simultaneously available frequency bands, and combination of available frequency bands to the base station apparatus 20.

Thereby, in the base station apparatus 20, the base station control unit 23 can detect frequency bands available to the terminal apparatus 10 and the number of simultaneously available frequency bands from the received frequency band information. The base station control unit 23 can select a frequency band to be used for communication with the terminal apparatus 10 according to the received frequency band information. As a result, the base station control unit 23 can prevent unnecessary allocations such as allocations of a combination of frequency bands simultaneously unavailable to the terminal apparatus 10 for communication and a combination of exclusively unavailable frequency bands, and can efficiently use the frequency bands.

Further, the base station control unit 23 may preferentially allocate a frequency band having a low communication load according to a use state of each frequency band and communication quality of each frequency band in addition to the frequency band information. Thereby, the wireless communication system 100 can improve transmission efficiency by communication.

Third Embodiment

Next, a configuration in which priority is provided in a frequency band to be used by the terminal apparatus 10 will be described as the third embodiment. A wireless communication system according to the third embodiment is the same as that of the first embodiment, except that content of frequency band information to be stored in the function information storing unit 13 and transmitted by the terminal control unit 14 via the wireless communication unit 12 and the antenna 11 is different, and thus the content of the frequency band information will be described and other descriptions will be omitted.

The frequency band information stored in the function information storing unit 13 is a bitstream in which three bits indicating each of frequency bands are arranged according to priority, not a bitstream in which frequency bands available to the terminal apparatus 10 are sequentially arranged. The number of simultaneously available frequency bands is arranged in the end of the bitstream. The function information storing unit 13 stores the frequency band information configured as described above.

Figure 7:
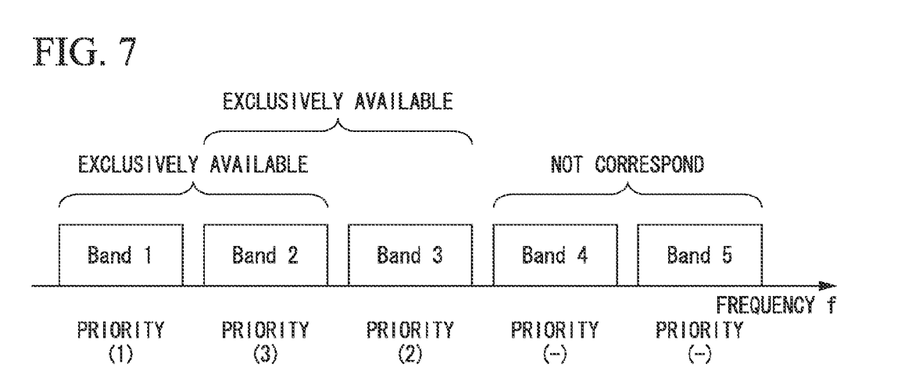
FIG. 7 is a diagram showing an example of frequency bands of a system frequency band available to a terminal apparatus 10 according to a third embodiment.

For example, the terminal apparatus 10 is a configuration in which frequency bands as shown in FIG. 7 are available by limitations of a hardware configuration as in the first embodiment, and priority is provided in each available frequency band. FIG. 7 is a diagram showing an example of frequency bands of the system frequency band available to the terminal apparatus 10 according to the third embodiment.

As shown, the terminal apparatus 10 can exclusively use frequency bands Band 1 and Band 2 and exclusively use frequency bands Band 2 and Band 3, but does not correspond to and cannot use frequency bands Band 4 and Band 5. Use priorities are provided in order of frequency bands Band 1, Band 3, and Band 2.

In this case, in the frequency band information, the number of frequency bands simultaneously available to the terminal apparatus 10 is arranged in the end of a bitstream in which three bits indicating each of the available frequency bands Band 1, Band 3, and Band 2 in this order are arranged. That is, the frequency band information becomes a bitstream "001 011 010 010."

In the base station apparatus 20, the base station control unit 23 determines whether or not each frequency band is allocated according to a use state and communication quality in order from a frequency band Band 1 having high priority according to frequency band information configured as described above, and selects a frequency band to be allocated to the terminal apparatus 10.

As described above, the frequency band information of this embodiment is configured so that a frequency band has priority, so that the base station control unit 23 of the base station apparatus 20 can allocate a frequency band according to priority when a frequency band of the terminal apparatus 10 is used. The base station control unit 23 can also allocate a frequency band according to priority of the terminal apparatus 10 even when a plurality of frequency bands are allocated.

Bits indicating an available frequency band are sequentially arranged in the frequency band information, but "000" indicating that no frequency band is used may be configured to be allocated to unavailable frequency bands Band 4 and Band 5. In this case, the frequency band information becomes a bitstream "001 011 010 000 000 010."

Fourth Embodiment

A configuration of frequency band information in which different priority is provided in a frequency band according to the number of simultaneously available frequency bands for frequency bands to be used by the terminal apparatus 10 will be described as the fourth embodiment. The fourth embodiment has the same configuration as the first embodiment, except that a configuration of a bitstream indicating frequency band information to be stored in the function information storing unit 13 of the terminal apparatus 10 and transmitted by the terminal control unit 14 via the wireless communication unit 12 and the antenna 11 is different, and thus content of the frequency band information will be described and other descriptions will be omitted.

In the frequency band information, when the number of frequency bands in the wireless communication system of this embodiment is n (n≥2) as a configuration of a bitstream indicating a combination of simultaneously available frequency bands and priority of the combination, a bitstream having an m-bit width (m=n×($_nC_1$+$_nC_2$+ . . . +$_nC_n$)) is divided every n bits, and n bits are allocated to frequency bands Band 1, Band 2, . . . , Band n in order from the least significant bit to the most significant bit. In addition, $_xC_y$ indicates the total number of different y combinations selected from different x pieces.

In first n×$_nC_1$ bits, an available frequency band including priority when one frequency band is used is indicated. A frequency band having highest priority is indicated by first n bits of the n×$_n C_1$ bits, a frequency band having the second highest priority is indicated by subsequent n bits, and thereafter frequency bands are indicated in descending order of priority. At this time, "1" is allocated to a corresponding frequency band and "0" is allocated to other frequency bands.

In the terminal apparatus 10, when at least the number of independently available frequency bands is r1 (r1>0), which is less than n, information up to a bitstream including r1 n-bit widths indicates an available frequency band including priority, and "0" is allocated to the remaining n×(n−r1) bits among the (n×n) bits.

In the next n×$_nC_2$ bits, an available frequency band including priority when two frequency bands are simultaneously used is indicated. "1" is allocated to a bit corresponding to two frequency bands combined in descending order of priority every n bits, and "0" is allocated to other bits.

Hereinafter, likewise, in n×$_nC_n$ bits, a bitstream indicating available frequency bands including priority until n frequency bands are simultaneously used is generated.

By configuring the frequency band information as described above, frequency band information indicating available frequency bands of the terminal apparatus 10 and a combination of simultaneously available frequency bands can be transmitted to the base station apparatus 20, and the base station control unit 23 of the base station apparatus 20 allocates frequency bands to the terminal apparatus 10 according to the received frequency band information. Thereby, it is possible to prevent unnecessary frequency-band allocation such as allocation of a combination of frequency bands simultaneously unavailable to the terminal apparatus 10, and efficiently use the frequency bands.

Figure 8:
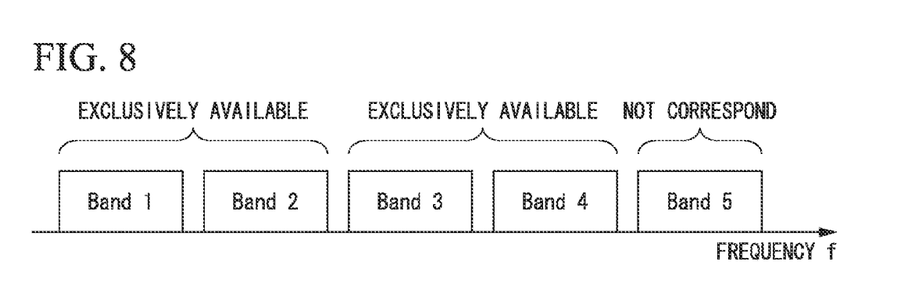
FIG. 8 is a diagram showing frequency bands of a system frequency band available to a terminal apparatus 10 according to a fourth embodiment.

An example of a bitstream generated by the terminal control unit 14 according to this embodiment will be described with reference to FIGS. 8 and 9. FIG. 8 is a diagram showing frequency bands of the system frequency band available to the terminal apparatus 10 according to the fourth embodiment.

As shown in FIG. 8, the system frequency band may be divided into five frequency bands Band 1 to Band 5. The terminal apparatus 10 can exclusively use the frequency bands Band 1 and Band 2 and exclusively use the frequency bands Band 3 and Band 4, but does not correspond to and cannot use a frequency band Band 5.

Although not shown, priorities are set in order of the frequency bands Band 1, Band 2, Band 3, and Band 4 when one frequency band is used. Further, when two frequency bands are simultaneously used, priorities are set in order of a combination of frequency bands Band 1 and Band 3, a combination of Band 2 and Band 3, a combination of Band 4 and Band 1, and a combination of Band 4 and Band 2.

Figure 9:
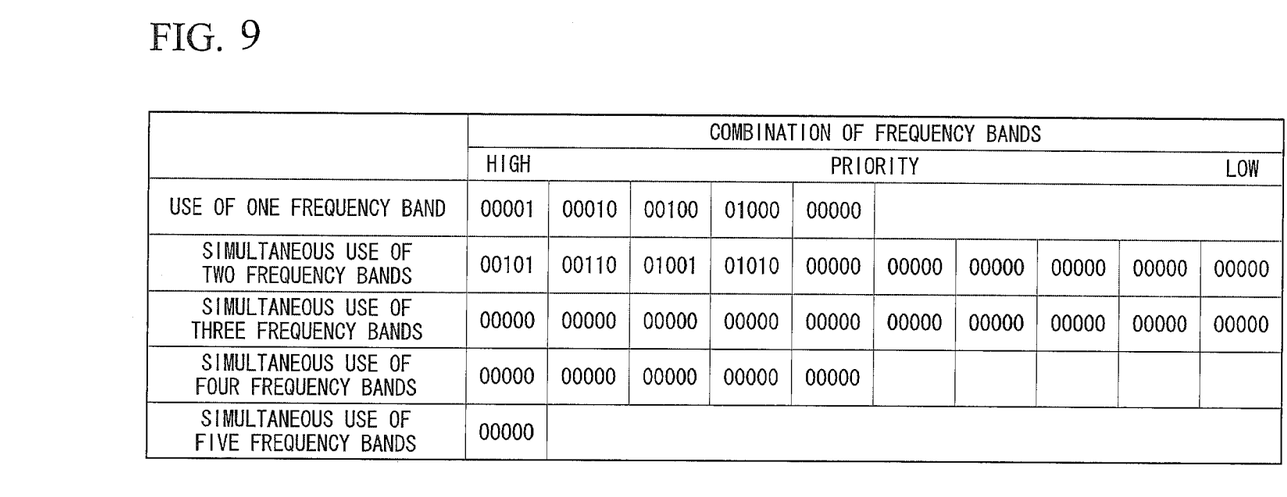
FIG. 9 is a diagram showing an example of information stored in a function information storing unit 13 of the terminal apparatus 10 according to the same embodiment when priority is set according to the same embodiment.

At this time, in the terminal apparatus 10, the terminal control unit 14 reads a bitstream having a width of 155 (=5×($_5C_1$+$_5C_2$+$_5C_3$+$_5C_4$+$_5C_5$)) bits as shown in FIG. 9 as frequency band information from the function information storing unit 13, and transmits the frequency band information to the base station apparatus 20 via the wireless communication unit 12.

FIG. 9 is a diagram showing an example of information stored in the function information storing unit 13 of the terminal apparatus 10 according to the same embodiment when priority is set according to the same embodiment. When one frequency band is used, "00001 00010 00100 01000 00000" is stored. Five-bit width bitstreams are respectively associated with the frequency bands Band 1 to Band 5 in order from the least significant bit, and the frequency bands available to the terminal apparatus 10 are indicated in association with priorities in order of the frequency bands Band 1, Band 2, Band 3, and Band 4.

When two frequency bands are simultaneously used, "00101 00110 01001 01010 00000 00000 00000 00000 00000 00000" is stored. As in the case where one frequency band is used, 5-bit width bitstreams are respectively associated with the frequency bands Band 1 to Band 5 in order from the least significant bit. Combinations of frequency bands available to the terminal apparatus 10 are indicated in order of a combination of the frequency bands Band 1 and Band 3, a combination of Band 2 and Band 3, a combination of Band 4 and Band 1, and a combination of Band 4 and Band 2, and selection priority is indicated.

In the base station apparatus 20, the base station control unit 23 selects a frequency band for communicating with the terminal apparatus 10 according to the above-described frequency band information, thereby allocating frequency bands according to priority of the terminal apparatus 10. Even when a plurality of frequency bands are allocated, the base station control unit 23 also allocates the frequency bands according to priority of the terminal apparatus 10.

Because "0" is allocated to all 80 bits of a second half of a bitstream, the base station control unit 23 determines that unnecessary frequency-band allocation occurs when three or more frequency bands are simultaneously allocated to the terminal apparatus 10. Thus, it is possible to omit a process of allocating three or more frequency bands and shorten a time when a frequency band is allocated to the terminal apparatus 10.

The frequency band information of this embodiment indicates all combinations of frequency bands available to the terminal apparatus 10, so that the base station apparatus 20 can reduce a processing amount of the base station control unit 23 because the base station control unit 23 can allocate a frequency band without detecting a combination of frequency bands available to the terminal apparatus 10.

Bits indicating the number of frequency bands simultaneously available to the terminal apparatus 10 may be arranged in the end of the bitstream. Thereby, bitstreams indicating frequency-band combinations simultaneously using three or more frequency bands are unnecessary, for example, in the frequency band information indicating combinations of frequency bands shown in FIG. 7. It is possible to reduce an information amount including the frequency band information by omitting the unnecessary bitstreams.

Fifth Embodiment

Figure 10:
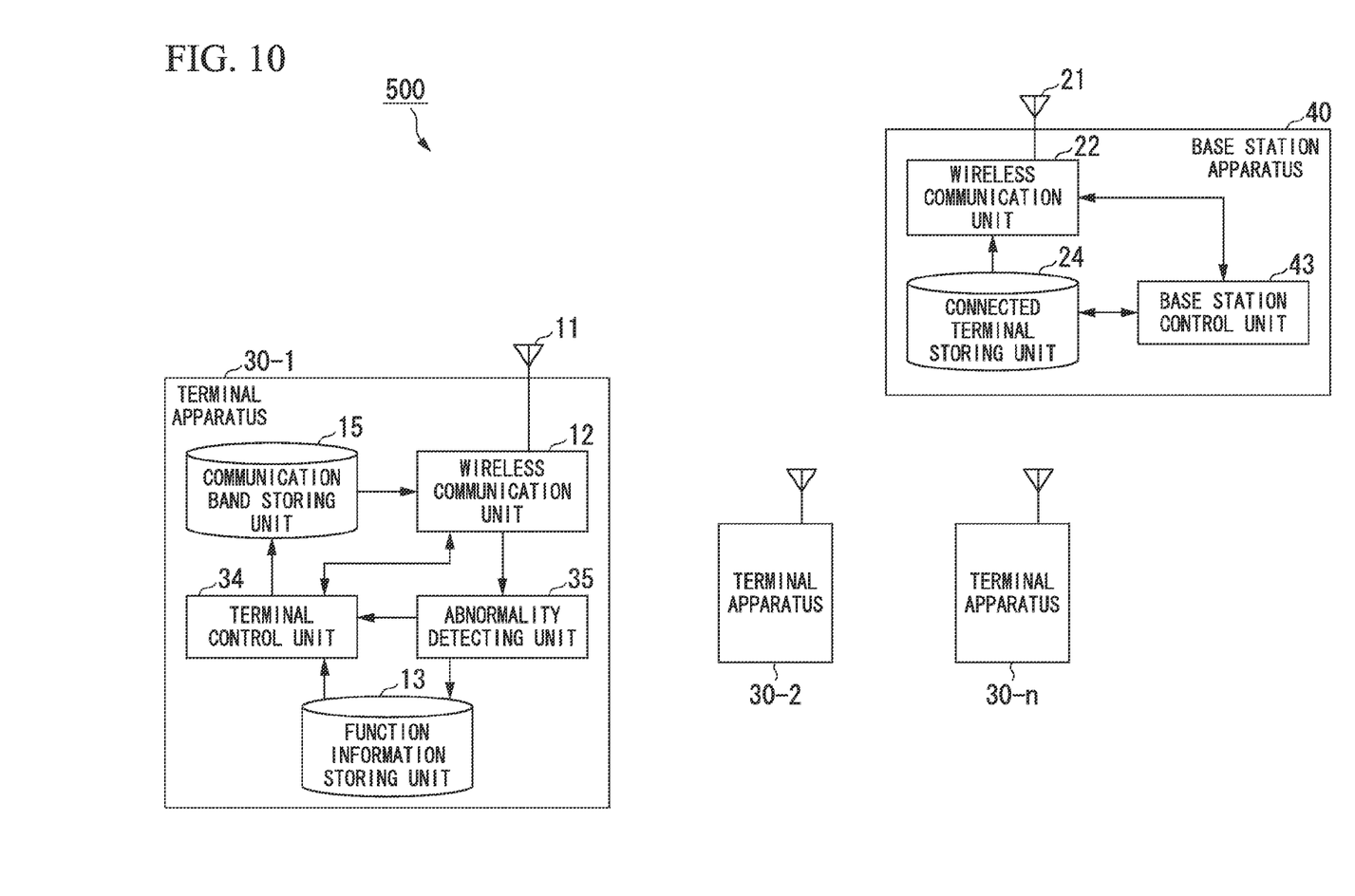
FIG. 10 is a schematic block diagram showing a configuration of a wireless communication system 500 according to a fifth embodiment.

FIG. 10 is a schematic block diagram showing a configuration of the wireless communication system 500 according to the fifth embodiment. As shown in FIG. 10, the wireless communication system 500 includes one or more terminal apparatuses 30-1, 30-2, . . . , 30-n, and a base station apparatus (communication apparatus) 20. Here, the terminal apparatuses 30-1, 30-2, . . . , 30-n have the same configuration. Hereinafter, any one or all of the terminal apparatuses 30-1, 30-2, . . . , 30-n is/are representatively referred to as a terminal apparatus 30. The wireless communication system 500 has the same configuration as the wireless communication system 100 of the first embodiment, except that the terminal apparatus 30 includes a terminal control unit 34 instead of the terminal control unit 14 included in the terminal apparatus 10 of the first embodiment, an abnormality detecting unit 35 is newly included, and the base station apparatus 40 includes a base station control unit 43 instead of the base station control unit 23 included in the base station apparatus 20 of the first embodiment, and thus the same reference numerals 11 to 13, 15, 21, 22, and 24 are assigned to the corresponding positions and description thereof is omitted.

The abnormality detecting unit 35 detects the abnormality of a communication function in the wireless communication unit 12, changes information of a corresponding frequency band by reading frequency band information stored in the function information storing unit 13 when the wireless communication unit 12 does not communicate with the base station apparatus 40 because of the abnormality, and outputs the changed frequency band information to the function information storing unit 13 to store the output changed frequency band information. In addition, the abnormality detecting unit 35 outputs information indicating that the frequency band information has been updated to the terminal control unit 14.

Here, the abnormality detecting unit 35 pre-stores a method of changing the frequency band information for every occurrence of abnormality, that is, a bitstream to be updated.

When the terminal control unit 34 sends a connection request to the base station apparatus 40 as in the terminal control unit 14 (FIG. 1) of the first embodiment, the function information storing unit 13 reads frequency band information and outputs connection request information including the read frequency band information and a terminal identifier for uniquely identifying its own terminal apparatus 30 to the wireless communication unit 12. The terminal control unit 34 reads information indicating a frequency band to be used for communication with the base station apparatus 40 from connection approval information as a response to the connection request received by the wireless communication unit 12 from the base station apparatus 40, and causes the communication band storing unit 15 to write and store the read information indicating the frequency band.

Further, when information indicating that the frequency band information has been updated is input from the abnormality detecting unit 35, the terminal control unit 34 reads the frequency band information from the function information storing unit 13 and transmits connection change information including the read frequency band information to the base station apparatus 40 via the wireless communication unit 12. Here, the connection change information includes the frequency band information updated as described above and the terminal identifier and is information for requesting a change of a frequency band being used for communication with the base station apparatus 40.

In the wireless base station apparatus 40, the base station control unit 43 reads the frequency band information and the terminal identifier included in the input connection request information when the connection request information received from the terminal apparatus 30 is input from the wireless communication unit 22, and reads the frequency band information and the terminal identifier included in the input connection change information when the connection change information received from the terminal apparatus 30 is input from the wireless communication unit 22.

In addition, the base station control unit 43 selects at least one frequency band from frequency bands indicated by the read frequency band information, associates the selected frequency band with the read terminal identifier, and causes the connected terminal storing unit 24 to write and store the selected frequency band and the read terminal identifier to be associated with each other. In addition, the base station control unit 43 generates connection approval information as responses to the connection request information and the connection change information, and outputs the generated connection approval information to the wireless communication unit 22 to transmit the connection approval information to the terminal apparatus 30. Here, the connection approval information includes the terminal identifier of the terminal apparatus 30 requesting the connection and information indicating the selected frequency band.

Figure 11:
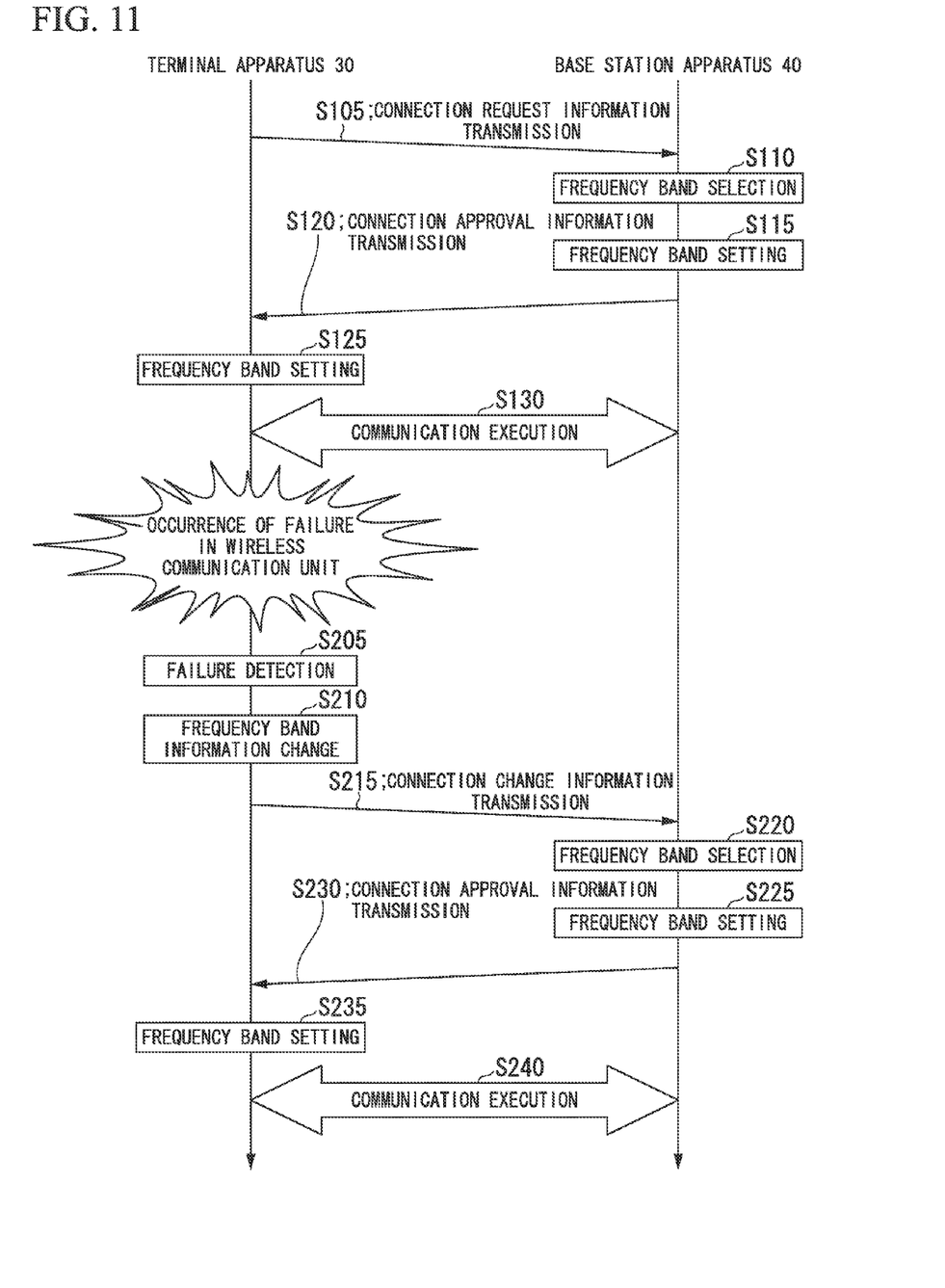
FIG. 11 is a diagram showing a sequence example of a connection process of setting a frequency band to be used for communication by a base station apparatus 40 and a terminal apparatus 30, and a sequence example of a change process of changing the frequency band to be used for communication, in the wireless communication system 500 according to the same embodiment.

FIG. 11 is a diagram showing a sequence example of a connection process of setting a frequency band to be used for communication by the base station apparatus 40 and the terminal apparatus 30, and a sequence example of a change process of changing a frequency band to be used for communication, in the wireless communication system 500 according to the same embodiment.

Because an operation of steps S105 to S130 in the drawing is the same as an operation of steps S105 to S130 shown in FIG. 4 of the first embodiment, description thereof is omitted. Frequency band information (FIG. 9) shown in the fourth embodiment is stored in the function information storing unit 13.

If a failure in which communication by a frequency band Band 4 being used for communication is not continued has occurred in an RF front-end circuit (not shown) provided in the wireless communication unit 12 of the terminal apparatus 30 when the terminal apparatus 30 communicates with the base station apparatus 40, the abnormality detecting unit 35 reads frequency band information stored in the function information storing unit 13 when detecting the failure of the wireless communication unit 12 (step S205), changes the frequency band information by deleting information indicating that the frequency band Band 4 is available from the read frequency band information, and outputs the changed frequency band information to the function information storing unit 13 to store the changed frequency band information (step S210).

Here, the abnormality detecting unit 35 deletes "01000" in the case of "Use of One Frequency Band" and "01001" and "01010" in the case of "Simultaneous Use of Two Frequency Bands," which are previously stored bitstreams to be updated or replaces the frequency band information (FIG. 9) stored in the function information storing unit 13 with "00000," thereby changing the frequency band information. Thereby, the base station control unit 43 of the base station apparatus 40 cannot select the frequency band Band 4.

If information indicating that the frequency band information has been changed is input from the abnormality detecting unit 35, the terminal control unit 34 reads the changed frequency band information from the function information storing unit 13, generates connection change information, including the read frequency band information, for requesting a change of a frequency band to be used for communication, and outputs the generated connection change information to the wireless communication unit 12 to transmit the generated connection change information to the base station apparatus 40 (step S215).

The base station control unit 43 reads the frequency band information and the terminal identifier included in the connection change information received by the wireless communication unit 22, and selects a frequency band from frequency bands available to the terminal apparatus 30 indicated by the frequency band information by setting the number of frequency bands simultaneously available to the terminal apparatus 30 indicated by the read frequency band information to an upper limit (step S220).

The base station control unit 43 associates the terminal identifier of the terminal apparatus 10 requesting a connection change and the frequency band selected in step S220, and outputs and writes the result of association to the connected terminal storing unit 24 (step S225).

In addition, the base station control unit 43 generates connection approval information as a response to the received connection change including the information indicating the selected frequency band, and transmits the generated connection approval information to the terminal apparatus 30 requesting the connection via the wireless communication unit 22 (step S230).

In the terminal apparatus 30, when the connection approval information is received from the base station apparatus 40, the wireless communication unit 12 outputs the received connection approval information to the terminal control unit 14. The terminal control unit 14 causes the communication band storing unit 15 to write and store information indicating a frequency band included in the connection approval information output by the wireless communication unit 12 (step S235).

The wireless communication unit 12 of the terminal apparatus 30 communicates with the base station apparatus 40 by use of the frequency band stored in the communication band storing unit 15, and the wireless communication unit 22 of the base station apparatus 40 communicates with the terminal apparatus 30 by use of a frequency band corresponding to the terminal apparatus 30 stored in the connected terminal storing unit 24 (step S240).

As described above, the wireless communication system 500 changes a frequency band to be used for communication of the terminal apparatus 30 and the base station apparatus 40, thereby deleting a frequency band in which communication does not continue due to a failure of the wireless communication unit 12 of the terminal apparatus 30 from a selection target and continuing communication using a frequency that does not fail. In addition, the base station apparatus 40 can efficiently use a frequency band by preventing unnecessary frequency-band allocation such as allocation of a frequency band unavailable for communication by the terminal apparatus 30.

An example of the failure in the wireless communication unit 22 includes a failure of an RF front-end circuit (not shown), a signal processing circuit (not shown), or the like included in the wireless communication unit 22. The failure is detected by performing measurement of a value of a current flowing through a circuit, measurement of a communication state, or the like, and determining whether or not the result of measurement is out of a range of a normal use state indicated by a predetermined threshold.

The same process may be performed so that a failure frequency band or a frequency band in which communication cannot be performed is not selected even when data is not transmitted/received due to a failure of the antenna 21 or significant degradation of communication quality in a frequency band being used as well as the failure in the wireless communication unit 22. At this time, for example, the degradation of communication quality is detected by the wireless communication unit 12 using a channel estimation value calculated by channel estimation using a pilot signal transmitted from the base station apparatus 40.

The same process as described above can also be performed when the RF front-end circuit, the communication processing circuit, or the like included in the wireless communication unit 22 is used for other purposes, for example, for multiple input multiple output (MIMO) or multimedia broadcast/multicast service (MBMS), as well as when a failure or communication degradation occurs.

Although a configuration for setting a frequency band to be used for communication when a connection request is sent from the terminal apparatus to the base station apparatus has been shown in the above-described first to fifth embodiments, a frequency band to be used for communication may be set according to a change of a communication band required for communication or the like while communication is performed.

In the above-described first to fifth embodiments, frequency band information may be configured to be stored in the function information storing unit for every plurality of operation modes. For example, a power-saving mode and a normal mode are provided as the operation modes. Frequency band information in which the number of frequency bands to be simultaneously used is reduced to reduce power consumption of a terminal apparatus from a communication speed is associated with the low-power consumption mode. Frequency band information corresponding to the number of frequency bands simultaneously available to the terminal apparatus is associated with the normal mode. It is possible to select a frequency band corresponding to power consumption in the terminal apparatus by switching the operation mode according to a user's operation on the terminal apparatus or the like.

For example, in the configuration of the frequency band information according to the second embodiment, the normal mode is "00011 00100 00000 00000 00000," and the power-saving mode is "00111 00000 00000 00000 00000." Thereby, because the frequency band information indicates that frequency bands Band 1, Band 2, and Band 3 are exclusively available in the power-saving mode, the base station control unit of the base station apparatus selects any one frequency band of the frequency bands Band 1, Band 2, and Band 3. Only the frequency band Band 3 may be selected by setting the power-saving mode to "00100 00000 00000 00000

00000." In the configuration of the frequency band information according to the fourth embodiment, it is possible to equally limit the number of frequency bands to be simultaneously used for communication if the frequency band information of the power-saving mode is a bitstream obtained by setting the entire bitstream corresponding to "Simultaneous Use of Two Frequency Bands" to "0."

Further, the terminal control unit may detect the remaining power of a battery provided in the terminal apparatus, and switch the above-described operation mode according to the remaining battery power. In this case, if the remaining battery power is equal to or less than a predetermined threshold, for example, if the remaining battery power is equal to or less than 30%, the terminal control unit generates connection request information or connection update information using frequency band information corresponding to the power-saving mode. When the remaining battery power is increased by battery charging, or when power is supplied from the outside, the terminal control unit uses the frequency band information corresponding to the normal mode. As described above, it is possible to perform a control operation of extending a time in which communication is possible by limiting simultaneously available frequency bands to reduce power consumption according to the remaining battery power.

An example in which a system frequency band is divided into five frequency bands has been described in the above-described first to fifth embodiments, but the present invention is also applicable to the case where the system frequency band is divided into two or more frequency bands. The base station control unit of the base station apparatus is configured to select a frequency band to be used for uplink and downlink, but different frequency bands for the uplink and downlink may be selected.

The frequency band information indicates frequency bands available to the terminal apparatus and combinations of available frequency bands, but may indicate frequency bands unavailable to the terminal apparatus in the system frequency band and combinations of unavailable frequency bands.

A computer system may be provided inside the above-described terminal apparatus or base station apparatus or both. In this case, each of a connection process of setting a frequency band to be used for communication described above and a change process of changing the frequency band to be used for communication is stored in a computer-readable recording medium in the form of a program. The above-described process is performed by reading and executing the program by a computer. Here, the computer-readable recording medium may be a magnetic disk, a magneto-optical disc, a compact disc read-only memory (CD-ROM), a digital versatile disc-ROM (DVD-ROM), a semiconductor memory, or the like. The computer program may be distributed to a computer over a communication line, and the computer receiving the distributed program may execute the program.

INDUSTRIAL APPLICABILITY

The present invention is applicable to mobile communication and fixed communication in which a base station apparatus selects a frequency band to be used for communication with a terminal apparatus.

REFERENCE SYMBOLS

10, 10-1, 10-2, 10-n: Terminal apparatus
11: Antenna
12: Wireless communication unit
13: Function information storing unit
14: Terminal control unit
15: Communication band storing unit
20: Base station apparatus
21: Antenna
22: Wireless communication unit
23: Base station control unit
24: Connected terminal storing unit
30, 30-1, 30-2, 30-n: Terminal apparatus
34: Terminal control unit
35: Abnormality detecting unit
40: Base station apparatus
43: Base station control unit
100, 500: Wireless communication system

The invention claimed is:

1. A wireless communication system comprising:
at least one terminal apparatus; and
one base station apparatus configured to perform communication in a plurality of frequency bands, wherein
the terminal apparatus comprises:
a first wireless communication unit configured to transmit frequency band information including first information and second information to the base station apparatus, wherein
the frequency band information corresponds to both uplink and down link,
the first information indicates available frequency bands to the terminal apparatus among the plurality of frequency bands, and
the second information regards the number of simultaneously available frequency bands to the terminal apparatus, and
the base station apparatus comprises:
a second wireless communication unit configured to receive the frequency band information from the terminal apparatus.

2. A wireless communication method for use in a wireless communication system comprising at least one terminal apparatus and one base station apparatus configured to perform communication in a plurality of frequency bands, the wireless communication method comprising:
transmitting frequency band information including first information and second information to the base station apparatus; and
receiving the frequency band information from the terminal apparatus, wherein
the frequency band information corresponds to both uplink and downlink,
the first information indicates available frequency bands among the plurality of frequency bands, and
the second information regards the number of simultaneously available frequency bands.

3. A terminal apparatus for use in a wireless communication system comprising at least one terminal apparatus and one base station apparatus configured to perform communication in a plurality of frequency bands, the terminal apparatus comprising:
a wireless communication unit configured to transmit frequency band information including first info nation and second information to the base station apparatus, wherein
the frequency band information corresponds to both uplink and downlink,
the first information indicates available frequency bands among the plurality of frequency bands, and
the second information regards the number of simultaneously available frequency band.

4. The terminal apparatus according to claim 3, wherein the frequency band information includes information indicating combinations of the frequency bands simultaneously available to the terminal apparatus among the plurality of frequency bands.

5. A base station apparatus for use in a wireless communication system comprising at least one terminal apparatus and one base station apparatus configured to perform communication in a plurality of frequency bands, the base station apparatus comprising:
 a wireless communication unit configured to receive frequency band information including first information and second information from the terminal apparatus, wherein
 the frequency band information corresponds to both uplink and downlink,
 the first information indicates available frequency bands to the terminal apparatus among the plurality of frequency bands, and
 the second information regards the number of simultaneously available frequency bands to the terminal apparatus.

6. The base station apparatus according to claim 5, wherein the frequency band information includes information indicating combinations of the frequency bands simultaneously available to the terminal apparatus among the plurality of frequency bands.

* * * * *